United States Patent
Han et al.

(10) Patent No.: US 11,579,126 B2
(45) Date of Patent: Feb. 14, 2023

(54) QUANTITATIVE ANALYSIS METHOD FOR MONOMER OF PHOTORESIST BINDER

(71) Applicant: LG Chem, Ltd., Seoul (KR)

(72) Inventors: Su Youn Han, Daejeon (KR); Yura Lee, Daejeon (KR); Byoung Hyoun Kim, Daejeon (KR)

(73) Assignee: LG Chem, Ltd.

( * ) Notice: Subject to any disclaimer, the term of this patent is extended or adjusted under 35 U.S.C. 154(b) by 608 days.

(21) Appl. No.: 16/603,712

(22) PCT Filed: Aug. 24, 2018

(86) PCT No.: PCT/KR2018/009792
§ 371 (c)(1),
(2) Date: Oct. 8, 2019

(87) PCT Pub. No.: WO2019/054663
PCT Pub. Date: Mar. 21, 2019

(65) Prior Publication Data
US 2020/0319151 A1 Oct. 8, 2020

(30) Foreign Application Priority Data
Sep. 13, 2017 (KR) .................. 10-2017-0117204

(51) Int. Cl.
*G01N 30/72* (2006.01)
*G01N 30/88* (2006.01)
*G01N 30/12* (2006.01)

(52) U.S. Cl.
CPC ............ *G01N 30/88* (2013.01); *G01N 30/12* (2013.01); *G01N 30/72* (2013.01); *G01N 2030/885* (2013.01)

(58) Field of Classification Search
CPC .............................. G01N 30/88; G01N 30/72
See application file for complete search history.

(56) References Cited

U.S. PATENT DOCUMENTS

| | | | |
|---|---|---|---|
| 4,996,134 A | 2/1991 | Enyo et al. | |
| 5,876,899 A | 3/1999 | Szmanda et al. | |
| 6,573,105 B1 | 6/2003 | Kanazawa et al. | |
| 2002/0062496 A1* | 5/2002 | Chapple | C12N 9/0073 800/278 |

(Continued)

FOREIGN PATENT DOCUMENTS

| | | |
|---|---|---|
| CN | 101669029 A | 3/2010 |
| CN | 104458994 A | 3/2015 |

(Continued)

OTHER PUBLICATIONS

International Search Report for Application No. PCT/KR2018/009792, dated Nov. 27, 2018, pp. 1-2.

(Continued)

*Primary Examiner* — Lisa M Caputo
*Assistant Examiner* — Alex T Devito
(74) *Attorney, Agent, or Firm* — Lerner, David, Littenberg, Krumholz & Mentlik, LLP

(57) ABSTRACT

A quantitative analysis method for a monomer of a color filter (CF) photoresist (PR) binder for a thin film transistor-liquid crystal display (TFT-LCD), performs quantitative analysis on a monomer of a CF PR binder for a RFT-LCD by using a Py-GC/MS used for qualitative analysis.

3 Claims, 3 Drawing Sheets

(56) References Cited

U.S. PATENT DOCUMENTS

| | | |
|---|---|---|
| 2008/0258344 A1 | 10/2008 | Regan et al. |
| 2010/0120161 A1 | 5/2010 | Iida |
| 2010/0272610 A1 | 10/2010 | Iida |
| 2016/0245970 A1 | 8/2016 | Um et al. |
| 2017/0190896 A1 | 7/2017 | Yamamori et al. |
| 2018/0321587 A1 | 11/2018 | Murakami et al. |

FOREIGN PATENT DOCUMENTS

| | | | | |
|---|---|---|---|---|
| CN | 106459267 A | | 2/2017 | |
| EP | 529643 A1 | * | 3/1993 | ............. G03F 7/033 |
| EP | 1710093 A1 | | 10/2006 | |
| JP | S60219208 A | | 11/1985 | |
| JP | S6227662 A | | 2/1987 | |
| JP | S62027662 A | | 2/1987 | |
| JP | H0844110 A | * | 2/1996 | ............. G03F 7/033 |
| JP | H09033508 A | | 2/1997 | |
| JP | 2001013122 A | | 1/2001 | |
| JP | 2006193479 A | * | 7/2006 | |
| JP | 2011247630 A | | 12/2011 | |
| JP | 2012078340 A | | 4/2012 | |
| JP | 2012220686 A | | 11/2012 | |
| JP | 2013249467 A | | 12/2013 | |
| JP | 2016155256 A | | 9/2016 | |
| JP | 2017039953 A | | 2/2017 | |
| KR | 20120010884 A | | 2/2012 | |
| KR | 101209618 B1 | | 12/2012 | |
| KR | 20140047190 A | | 4/2014 | |
| KR | 20140097355 A | | 8/2014 | |
| KR | 20150039089 A | | 4/2015 | |
| KR | 20160036997 A | | 4/2016 | |
| KR | 20170028240 A | | 3/2017 | |
| WO | WO-2007015437 A1 | * | 2/2007 | ............. C08F 2/06 |

OTHER PUBLICATIONS

Kim et al., Gas Chromatographic Method for the Determination of Residual Monomers, 2-(Acryloyloxy)ethyl Isocyanate and 2-(Methacryloyloxy)ethyl Isocyanate, as Curing Agents in an Ultraviolet Curable Adhesive, Journal of Chromatographic Science, Advance Access publication Jan. 2013, pp. 143-148, vol. 52, Oxford University Press.

Kim et al., Thermal degradation behavior of rigid and soft polyurethanes based on methylene diphenyl diisocyanate using evolved gas analysis-(gaschromatography)-mass spectrometry, Journal of Analytical and Applied Pyrolysis, Available online Oct. 2012, pp. 236-241, Elsevier B.V.

Extended European Search Report with Written Opinion for Application No. 18856906.5 dated Oct. 2, 2020, 7 pages.

Japanese Search Report for Application No. 2019553436 dated Sep. 28, 2028, 7 pages.

Chinese Search Report for Application No. 201880022714.9, dated May 26, 2021, 2 pages.

* cited by examiner

[FIG. 1]
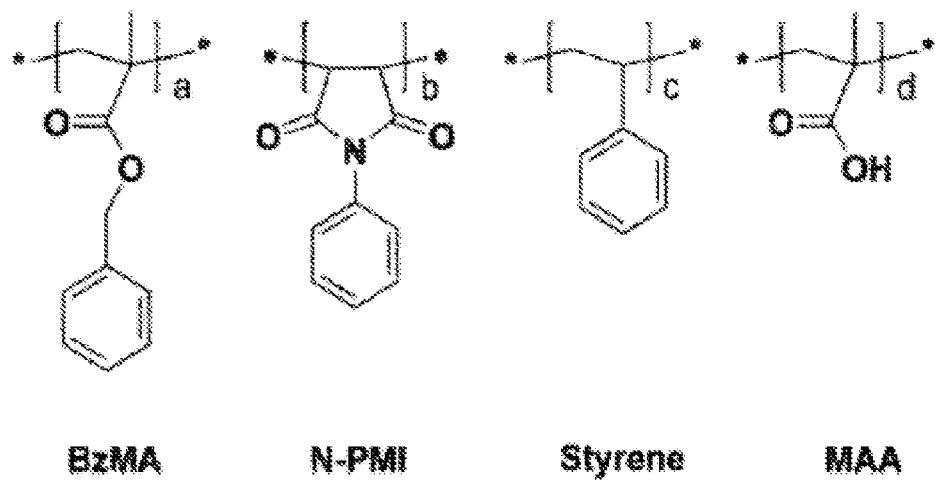

[FIG. 2]
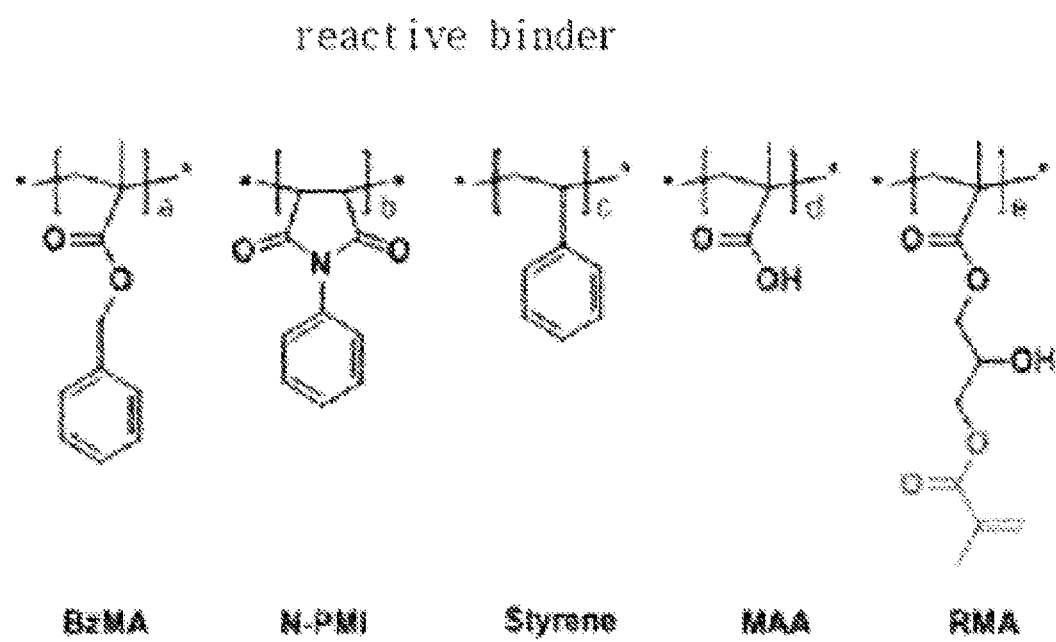

[FIG. 3]
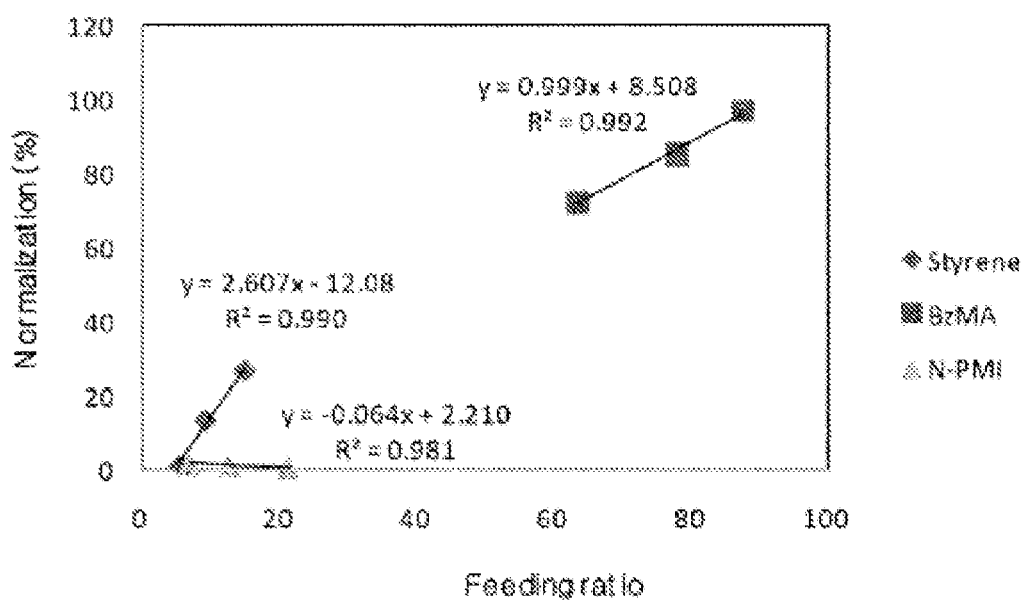

QUANTITATIVE ANALYSIS METHOD FOR MONOMER OF PHOTORESIST BINDER

CROSS-REFERENCE TO RELATED APPLICATIONS

This application is a national phase entry under 35 U.S.C. § 371 of International Application No. PCT/KR2018/009792, filed Aug. 24, 2018, which claims priority to Korean Patent Application No. 10-2017-0117204, filed Sep. 13, 2017, the entire disclosure of which is incorporated herein by reference.

TECHNICAL FIELD

The present invention relates to a method for quantitative analysis of monomers in a photoresist (PR) binder, specifically a color filter (CF) PR binder for a thin film transistor-liquid crystal display (TFT-LCD).

BACKGROUND ART

A TFT-LCD is an advanced liquid crystal display (LCD) which independently drives each pixel by adding an active element TFT (thin film transistor) to each pixel in a LCD. The TFT-LCD is a product with a higher resolution by covering a thin semiconductor film made of silicon on a glass plate, in which the TFT is an ultrathin film and turns on and off for each pixel on the LCD, so that each pixel is independently driven. The TFT-LCD is largely composed of a bottom glass substrate on which the TFT is formed, a top glass substrate on which a color filter is formed, and a liquid crystal injected therebetween. The TFT serves to transmit and control electrical signals, and the liquid crystal controls the transmission of light by varying the molecular structure according to the applied voltage. The light thus controlled passes through the color filter and appears as a desired color and image.

The color screen of the TFT-LCD provides colors controlled by adjusting the transmittance of white light emitted from a backlight (BL) unit through the liquid crystal cell and obtained by mixing lights emitted from a RGB (red, green, blue) color filter. The color filter substrate is composed of a black matrix (BM) for intercepting light between cells, an RGB pattern for providing color, and a common electrode (ITO) for applying voltage to the liquid crystal cell.

A color filter photoresist (CFPR) is a photosensitive resin obtained by mixing a polymer and a photosensitive material and it exhibits RGB colors. The CFPR is mainly made of a millbase [a pigment, a polymeric dispersant, and a solvent], a polymeric binder, a photoinitiator, a multifunctional monomer (MM), and additional additives. The binders used for the photoresist may be divided into a linear binder and a reactive binder. Unlike the linear binder, the reactive binder has reactive monomers (with —OH group) which allow further reaction.

The composition of the photoresist has been analyzed by using GC/MS, Py-GC/MS and LC/MS, and the composition of monomers in the binder has been analyzed by using NMR (see Journal of Analytical and Applied Pyrolysis 98 (2012) 236-241; Journal of Chromatographic Science 52 (2014) 143-148). However, the NMR analysis has limitations as the monomer components constantly become diverse and complicated. For this reason, there is a trial to establish a quantitative analysis method by pyrolysis, but it is necessary to overcome quantitative measurement errors due to the precipitation of a binder in a PR solution and optimize quantitative analysis conditions such as sample weight and oven conditions as various kinds of monomers are used.

Previous Py-GC/MS has been applied only in qualitative analysis to determine the composition of several pyrolysates produced by the pyrolysis mechanism of polymers and to determine monomer components constituting polymers. The present inventors have endeavored to investigate the Py-GC/MS in quantitative aspect and attained information on pyrolysis efficiency to develop a method for analyzing the content of monomers in a photoresist binder, which can be variously utilized in general laboratories.

DETAILED DESCRIPTION OF THE INVENTION

Technical Problem

The object of the present invention is to provide a quantitative analysis method of monomers in a color filter photoresist (PR) binder for a TFF-LCD by using Py-GC/MS which has been applied in qualitative analysis.

Technical Solution

In order to accomplish the object, the present invention provides a method for quantitative analysis of monomers in a photoresist (PR) binder obtained by polymerization of two or more monomers, which comprises the steps of: (1) preparing a binder as a standard obtained by polymerization of same kind of monomers as those comprised in the PR binder; (2) subjecting each of the standard prepared in the step (1) and the PR binder into Py-GC/MS analysis; and (3) normalizing the analysis result of the step (2) to determine the weight ratios of the two or more monomers in the PR binder.

Advantageous Effects

The quantitative analysis of the present invention can be used in determining the content of monomers contained in a PR binder by using Py-GC/MS which has been previously applied in qualitative analysis.

BRIEF DESCRIPTION OF THE DRAWINGS

FIG. 1 shows the kind of monomers contained in a linear binder among photoresist (PR) binders.

FIG. 2 shows the kind of monomers contained in a reactive binder among the PR binders.

FIG. 3 shows a calibration curve of normalized area (%) versus the feeding ratio of monomers in binder A (consisting of benzyl methacrylate (BzMA). N-phenylmaleimide (N-PMI) and styrene) in accordance with the present invention.

BEST MODE

Hereinafter, the present invention will be described in detail.

It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The present invention relates to an analysis method which comprises analysis of a photoresist (PR) binder via Py-GC/MS by using a standard having the same two or more monomers as the PR binder to be analyzed and each contend thereof being confirmed and normalization of the analyzed results to quantitatively identify the weight ratios of the two or more monomers in the PR binder.

Generally, the Py-GC/MS has been applied only in qualitative analysis to determine the composition of several pyrolysates produced by the pyrolysis mechanism of polymers and to determine monomer components constituting polymers. The composition of monomers in the binder has been analyzed by using NMR, which has limitations as the monomer components are complicated.

The present invention investigates the Py-GC/MS in quantitative aspect and attains information on pyrolysis efficiency to develop a method for analyzing the content of monomers in a photoresist binder, which can be variously utilized in general laboratories.

Therefore, the present invention provides a method for quantitative analysis of monomers in a PR binder obtained by polymerization of two or more monomers, which comprises the steps of: (1) preparing a binder obtained by polymerization of the same monomers as the PR binder as a standard; (2) analyzing the standard prepared in the step (1) and the PR binder by using Py-GC/MS; and (3) normalizing the analysis results of the step (2) to determine the weight ratios of the two or more monomers in the PR binder.

In one embodiment, the monomers in the PR binder may comprise acrylate monomer or methacrylate monomer, for example two or more monomers selected from the group consisting of ethyl hexyl acrylate (EHA), butyl acrylate (BA), methyl acrylate (MA), ethyl acrylate (EA), ethyl hexyl methacrylate (EHMA), butyl methacrylate (BMA), methyl methacrylate (MMA), ethyl methacrylate (EMA), benzyl methacrylate (BzMA), N-phenylmaleimide (N-PMI), styrene, lauryl methacrylate (LMA), cyclohexyl methacrylate (CHMA), methyl methacrylate (MMA), and 2-hydroxypropane-1,3-diyl bis(2-methylacrylate) (reactive methacrylate, RMA).

In one embodiment, a linear binder among the PR binders is subject to radical polymerization by a single step reaction, and a reactive binder reacts a part of MMA in the linear binder with the epoxy of glycidyl methacrylate (GMA) by a 2-step reaction to introduce a reactive site.

In the standard prepared in the step (1), its ratios of two or more monomers may be the same or different from that of the PR binder to be analyzed.

The Py-GC/MS analysis in the step (2) is not particularly limited if it is performed by an analyzer being conventionally used for gas chromatography and mass spectrometry. The Py-GC/MS analysis in the step (2) may be performed at a pyrolyzer temperature of 500 to 700° C. according to one embodiment, or 550 to 650° C. according to other embodiment. In the Py-GC/MS analysis in the step (2), the temperature of a GC oven may be maintained at 50 to 60° C. for 3 to 10 minutes, and then increased to 300 to 350° C. at a rate of 10 to 15° C./min, and finally maintained at 300 to 350° C. for 5 to 20 minutes.

The pyrolysis mechanism of the PR binder is divided into depolymerization, chain cleavage, elimination and the like. Particularly, when the methacrylate binder is subject to depolymerization, its monomer components decomposed can be detected to analyze the composition of the binder resin.

The pyrolysis rate obtained by depolymerization as the pyrolysis mechanism of the PR binder to be analyzed may varied depending on the ratios of two or more monomers constituting the PR binder.

Considering the above matters, the quantitative analysis of monomers in a PR binder according to the present invention uses a PR binder having the same two or more monomers as the PR binder to be analyzed as a standard and obtains the precise content ratio of the monomers by using Py-GC/MS analysis.

Hereinafter, the present invention will be described in more detail with reference to Examples. It will be apparent to those skilled in the art that the following examples are intended to be illustrative of the present invention and not to be construed as limiting the scope of the invention.

EXAMPLE

1. Composition of Monomers in PR Binder Samples

In this example, 3 linear binders and 3 reactive binders having monomer compositions as shown in Table 1 below were analyzed.

TABLE 1

| | | Information of PR 6 binders | | | | | | |
|---|---|---|---|---|---|---|---|---|
| | | Monomer feeding ratio (wt %) | | | | | | |
| | Analysis | Bzma[1] | N-PMI[2] | Styrene | LMA[3] | CHMA[4] | MMA[5] | RMA[6] |
| Linear binder | Binder A | 78.0 | 12.8 | 9.3 | — | — | — | — |
| | Binder B | 56.7 | 9.3 | 6.7 | 27.3 | — | — | — |
| | Binder C | — | — | — | — | 71.6 | 28.4 | — |
| Reactive binder | Binder D | 86.2 | — | — | — | — | — | 13.8 |
| | Binder E | 17.2 | 32.3 | 19.4 | — | — | 9.8 | 20.4 |
| | Binder F | — | — | — | — | 48.9 | 4.4 | 45.6 |

[1] benzyl methacrylate,
[2] N-phenylmaleimide,
[3] lauryl methacrylate,
[4] cyclohexyl methacrylate
[5] methyl methacrylate,
[6] 2-hydroxypropane-1,3-diyl bis(2-methylacrylate)

The structures of monomers constituting the PR binder were shown in Table 2 below and FIGS. 1 and 2.

TABLE 2

| # | Structure |
|---|---|
| 1 | 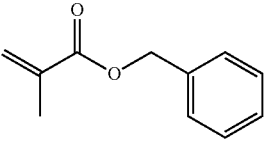 BzMA |
| 2 | 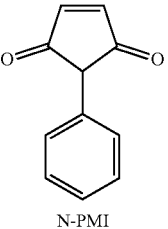 N-PMI |
| 3 |  Styrene |
| 4 | 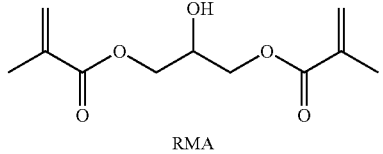 RMA |
| 5 | 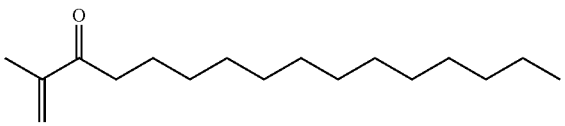 [SMILES: C=C(C)C(=O)CCCCCCCCCCCCC] LMA |
| 6 | 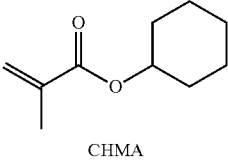 CHMA |
| 7 | 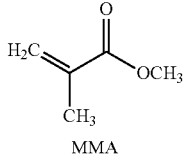 MMA |

2. Preparation of Samples

For each of PR binders A to F, three different standards 1, 2 and 3 were prepared by using the same kinds of monomers in their different contents. Three standards for each PR binder were exhibited to have monomer compositions and contents shown in Tables 3 to 8 below.

TABLE 3

Monomer feeding ratio (wt %) in Standard for Binder A

|  | BzMA[1] | N-PMI[2] | styrene |
|---|---|---|---|
| 1 | 64 | 21 | 15 |
| 2 | 78 | 13 | 9 |
| 3 | 88 | 7 | 6 |

[1] benzyl methacrylate,
[2] N-phenylmaleimide

TABLE 4

Monomer feeding ratio (wt %) in Standard for Binder B

|  | BzMA[1] | N-PMI[2] | styrene | LMA[3] |
|---|---|---|---|---|
| 1 | 29 | 14 | 9 | 47 |
| 2 | 57 | 9 | 7 | 27 |
| 3 | 78 | 6 | 3 | 13 |

[1] benzyl methacrylate,
[2] N-phenylmaleimide,
[3] lauryl methacrylate

TABLE 5

Monomer feeding ratio (wt %) in Standard for Binder C

|  | CHMA[1] | MMA[2] |
|---|---|---|
| 1 | 84 | 16 |
| 2 | 72 | 28 |
| 3 | 43 | 57 |

[1] cyclohexyl methacrylate,
[2] methyl methacrylate

TABLE 6

Monomer feeding ratio (wt %) in Standard for Binder D

|  | BzMA[1] | RMA[2] |
|---|---|---|
| 1 | 79 | 21 |
| 2 | 87 | 13 |
| 3 | 94 | 6 |

[1] benzyl methacrylate,
[2] 2-hydroxypropane-1,3-diyl bis(2-methylacrylate)

TABLE 7

Monomer feeding ratio (wt %) in Standard for Binder E

|  | BzMA[1] | N-PMI[2] | Styrene | MMA[3] | RMA[4] |
|---|---|---|---|---|---|
| 1 | 34 | 25 | 16 | 17 | 9 |
| 2 | 17 | 32 | 20 | 10 | 20 |
| 3 | 51 | 12 | 8 | 4 | 25 |

[1] benzyl methacrylate,
[2] N-phenylmaleimide,
[3] methyl methacrylate,
[4] 2-hydroxypropane-1,3-diyl bis(2-methylacrylate)

TABLE 8

Monomer feeding ratio (wt %) in Standard for Binder F

| | CHMA[1] | MMA[2] | RMA[3] |
|---|---|---|---|
| 1 | 47 | 14 | 39 |
| 2 | 49 | 5 | 46 |
| 3 | 44 | 31 | 26 |

[1]cyclohexyl methacrylate,
[2]methyl methacrylate,
[3]2-hydroxypropane-1,3-diyl bis(2-methylacrylate)

3. Analysis Methods and Conditions
(1) NMR (Nuclear Magnetic Resonance) Analysis Bruker AvanceIII HD 700 MHz NMR spectrometer equipped with 5 mm PABBO probe was used for proton NMR experiments. As the pretreatment, 10 mg of the sample was put in a vial and 0.75 mL of acetone-d6 as a solvent was added thereto to dissolve the sample. The resultant solution was transferred into an NMR tube for experiments. The experiments were performed under the conditions of zg30 pulse sequence and 32 times scan with 5 seconds of relaxation delay time. An elemental analysis was carried out by accurately measuring 1.3 to 1.5 mg of each sample into a Sn sample cup and using Flash 2000 (Thermo Fisher Scientific) as an elemental analyzer under the operation conditions of 1060° C. as a furnace temperature, 65° C. as an oven temperature, and 140 ml/min as a flow rate.

(2) Py-GC/MS (Pyrolysis-Gas Chromatography/Mass Spectrometry) Analysis

For Py-GC/MS, the pyrolysis of the sample was performed in a furnace being maintained to 600° C., and then the sample was analyzed by using Ultra ALLOY-5 (5% diphenyl-95% dimethylpolysiloxane) metal column (0.25 mm I.D.×30 m L., 0.25 μm of coated film thickness, Frontier Laboratories) connected to Agilent 7890A GC system equipped with a pyrolyzer and 5975C inert XL mass selective detector (MSD). Specifically, the sample was left on a GC oven set at 50° C. for 5 minutes and the temperature of the oven was increased to 320° C. at a rate of 10° C./min to give chromatograms under the conditions: 1 mL/min of flow rate of He (carrier gas); 1/50 of split ratio of injector; 300° C. of injector, oven and interface temperature of GC/MS; 320° C. of interface temperature of the pyrolyzer and 20 to 600 m/z of MSD scan mode. The 3 standards for each PR binder were tested and a calibration curve for each monomer was given. About 1 mg of the binder was measured with a micro-balance, transferred to a sample cup, and subjected to Py-GC/MS analysis.

The area % of the detected monomers was substituted into the calibration curve, and the content of each monomer was determined and normalized to obtain the weight ratios of the monomers.

(3) Elemental Analysis by EA (Elemental Analyzer)

An elemental analysis was carried out by accurately measuring 1.3 to 1.5 mg of each sample into a Sn sample cup and using Flash 2000 (Thermo Fisher Scientific) as an elemental analyzer under the operation conditions of 1060° C. as a furnace temperature, 65° C. as an oven temperature, and 140 ml/min as a flow rate.

Example 1

For a PR binder containing benzyl methacrylate (BzMA), N-phenylmaleimide (N-PMI) and styrene monomers, 3 standards and a sample of binder A were taken in the amount of 0.5 mg, 1 mg, 1.5 mg and 2 mg, respectively, and then tested after accurately weighing their weight up to 0.1 mg unit. By using Py-GC/MS (pyrolyzer temperature: 600° C.), the area % of each monomer was measured and the measured values were substituted into the calibration curve to normalize the values. The results thereof were shown in Tables 9 and 10 below.

TABLE 9

Result of Normalization for Monomers in Binder A

| | Normalization | | |
|---|---|---|---|
| Area % | styrene | BzMA[1] | N-PMI[2] |
| Standard 1 | 26.69 | 72.45 | 0.86 |
| Standard 2 | 15.76 | 82.83 | 1.41 |
| Standard 3 | 1.48 | 96.71 | 1.81 |

[1]benzyl methacrylate,
[2]N-phenylmaleimide

TABLE 10

Results of Feeding Ratio in Binder A

| | Styrene | | BzMA[1] | | N-PMI[2] | |
|---|---|---|---|---|---|---|
| | Feeding Ratio | Normalization | Feeding Ratio | Normalization | Feeding Ratio | Normalization |
| Standard 1 | 15 | 26.69 | 64 | 72.45 | 21 | 0.86 |
| Standard 2 | 9 | 15.76 | 78 | 82.83 | 13 | 1.41 |
| Standard 3 | 6 | 1.48 | 88 | 96.71 | 7 | 1.81 |

[1]benzyl methacrylate,
[2]N-phenylmaleimide

Based on FIG. 3 showing a calibration curve of normalized area (%) versus the feeding ratio of the monomers, the 3 standards were subject to quantitative analysis to obtain recovery ratios and errors for the samples of PR binder whose feeding ratios were confirmed. As shown in Table 11 below, the error range between the recovery ratios of BzMA, N-PMI and styrene which are monomers of the PR binder A and the feeding ratios thereof was found to be from 0.4% to maximum 8.1%.

TABLE 11

Error between Recovery Ratio and Feeding Ratio in PR Binder

| | Styrene | BzMA[1] | N-PMI[2] |
|---|---|---|---|
| Recovery Ratio | 10.0% | 77.7% | 12.3% |
| Feeding Ratio | 9.2% | 78.0% | 12.8% |
| Error | 8.1% | 0.4% | 3.7% |

[1]benzyl methacrylate,
[2]N-phenylmaleimide

Example 2: Results of Quantitative Analyses by Using Py-GC/MS, NMR and NMR+EA Methods This example performed quantitative analyses for total 6 samples of linear binders and reactive binders, and the results from each analysis method were shown in Table 12 below. For the binders C, D and F, it was confirmed that the NMR method provided less error than the Py-GC/MS method. For the binders A, B and E, it was confirmed that the Py-GC/MS method provided less error than the NMR method.

From these results, it can be seen that the Py-GC/MS method is more suitable for a binder containing four or more monomers. The EA method was used to calibrate the content of N in NMR calculations (NMR+EA method).

TABLE 12

Recovery Ratio and Error of Monomers in 6 Binder Samples by Analysis of Py-GC/MS, NMR and NMR + EA

| Sample | Analysis Method | Monomer (wt %) (deviation) | | | | | | |
|---|---|---|---|---|---|---|---|---|
| | | BzMA[1] | N-PMI[2] | Styrene | LMA[3] | CHMA[4] | MMA[5] | RMA[6] |
| Binder A | Feeding Ratio | 78.0 | 12.8 | 9.2 | — | — | — | — |
| | Py-GC/MS | 77.7 (0.4) | 12.3 (3.7) | 10.0 (8.1) | — | — | — | — |
| | NMR | 76.4 (2.0) | 16.2 (27.1) | 7.4 (20.5) | — | — | — | — |
| | NMR + EA | 77.0 (1.3) | 14.5 (13.5) | 8.5 (7.8) | — | — | — | — |
| Binder B | Feeding Ratio | 56.7 | 9.3 | 6.7 | 27.3 | — | — | — |
| | Py-GC/MS | 61.5 (8.5) | 9.4 (1.2) | 7.3 (8.3) | 21.8 (20.1) | — | — | — |
| | NMR | 56.2 (0.8) | 12.9 (39.3) | 7.8 (15.9) | 23.1 (15.5) | — | — | — |
| | NMR + EA | 56.1 (0.9) | 13.0 (39.7) | 7.7 (14.9) | 23.2 (15.2) | — | — | — |
| Binder C | Feeding Ratio | — | — | — | — | 71.6 | 28.4 | — |
| | Py-GC/MS | — | — | — | — | 67.6 (5.5) | 32.4 (14.0) | — |
| | NMR | — | — | — | — | 71.5 (0.2) | 28.5 (0.4) | — |
| Binder D | Feeding Ratio | 86.2 | — | — | — | — | — | 13.8 |
| | Py-GC/MS | 85.4 (1.0) | — | — | — | — | — | 14.6 (6.1) |
| | NMR | 86.6 (0.4) | — | — | — | — | — | 13.4 (2.7) |
| Binder E | Feeding Ratio | 17.4 | 32.6 | 19.5 | — | — | 9.9 | 20.6 |
| | Py-GC/MS | 17.5 (0.5) | 32.6 (0.0) | 20.7 (5.7) | — | — | 8.9 (9.5) | 20.3 (1.4) |
| | NMR | 17.0 (2.3) | 39.9 (22.5) | 17.3 (11.5) | — | — | 7.9 (20.1) | 17.9 (13.0) |
| | NMR + EA | 17.4 (0.1) | 34.8 (6.9) | 21.3 (8.8) | — | — | 8.0 (18.8) | 18.5 (10.1) |
| Binder F | Feeding Ratio | — | — | — | — | 49.4 | 4.5 | 46.1 |
| | Py-GC/MS | — | — | — | — | 52.4 (6.1) | 4.8 (6.3) | 42.8 (7.1) |
| | NMR | — | — | — | — | 52.3 (5.9) | 4.4 (2.7) | 43.3 (6.1) |

[1] benzyl methacrylate,
[2] N-phenylmaleimide,
[3] lauryl methacrylate,
[4] cyclohexyl methacrylate
[5] methyl methacrylate,
[6] 2-hydroxypropane-1,3-diyl bis(2-methylacrylate)

While the present invention has been particularly shown and described with reference to figures and embodiments thereof, it will be understood by those of ordinary skill in the art that the scope of the present invention is not limited thereby and that various changes and modifications may be made therein. Therefore, the actual scope of the present invention will be defined by the appended claims and their equivalents.

What is claimed is:

1. A method for quantitative analysis of monomers in a photoresist (PR) binder obtained by polymerization of four or more monomers, comprising:
   (1) preparing a binder as a standard obtained by polymerization of same kind of monomers as those comprised in the PR binder;
   (2) subjecting each of the standard prepared in the step (1) and the PR binder into Py-GC/MS analysis to obtain analysis results; and
   (3) normalizing the analysis results of the step (2) to determine weight ratios of the two or more monomers in the PR binder,
   wherein the normalizing comprises measuring area % of each of the monomers and substituting the area % of the monomers into a calibration curve,
   wherein the four or more monomers are selected from benzyl methacrylate (BzMA), Nphenylmaleimide (N-PM), styrene, lauryl methacrylate (LMA), cyclohexyl methacrylate (CHMA), methyl methacrylate (MMA), and 2-hydroxypropane-1,3-diylbis(2-methylacrylate)(reactive methacrylate, RMA).

2. The method of claim 1, wherein the Py-GC/MS analysis is performed at a pyrolyzer temperature of 500 to 700° C.

3. The method of claim 1, wherein during the performing of the Py-GC/MS analysis, a GC oven temperature is maintained at 50 to 60° C. for 3 to 10 minutes, and then increased to 300 to 350° C. at a rate of 10 to 15° C./min, and finally maintained at 300 to 350° C. for 5 to 20 minutes.

* * * * *